United States Patent [19]

Saito

[11] 4,174,050

[45] Nov. 13, 1979

[54] DEVICE FOR SUPPLYING A REPLENISHING TONER TO A DEVELOPING UNIT

[75] Inventor: Tomio Saito, Hachioji, Japan

[73] Assignee: Konishiroku Photo Industry Co., Ltd., Tokyo, Japan

[21] Appl. No.: 786,546

[22] Filed: Apr. 11, 1977

[30] Foreign Application Priority Data

Apr. 16, 1976 [JP] Japan ........ 51/43212

[51] Int. Cl.[2] ........ G01F 11/10

[52] U.S. Cl. ........ 222/43; 222/48; 222/287; 222/DIG. 1; 74/142

[58] Field of Search ........ 222/43, 44, 48, 287, 222/336, 360, DIG. 1, 306, 221, 368, 434, 444, 410, 414; 221/266, 277; 74/142

[56] References Cited

U.S. PATENT DOCUMENTS

| | | | |
|---|---|---|---|
| 998,902 | 7/1911 | Hoyt | 222/48 |
| 1,636,910 | 7/1927 | Hardy | 222/48 X |
| 3,184,108 | 5/1965 | Grau | 222/48 X |
| 3,572,922 | 3/1971 | Olden | 355/3 |
| 3,616,969 | 11/1971 | Koizumi | 222/162 |
| 3,834,592 | 9/1974 | Cherian | 222/287 X |
| 3,946,910 | 3/1976 | Case | 222/DIG. 1 X |

OTHER PUBLICATIONS

*IBM Technical Disclosure Bulletin,* vol. 17, No. 4, Sep. 1974, pp. 1129–1130, Cox et al., "Toner Replenisher Clutch."

*Primary Examiner*—Robert J. Spar
*Assistant Examiner*—Fred A. Silverberg
*Attorney, Agent, or Firm*—Lane, Aitken & Ziems

[57] ABSTRACT

A device for supplying a toner to a developing unit provided in an electrophotographic copying machine in which a toner supplying member at the bottom of the hopper may be rotated only in one direction, which may be manually operated or driven in association with a prime mover during copying operation. There is provided a rockable member attached to a protruding portion of the supplying member by a one-way clutch, which is rockable about an axis coaxial with the supplying member, the one-way clutch being adapted to be engaged with the rockable member only in the rotational direction of the supplying member.

6 Claims, 4 Drawing Figures

DEVICE FOR SUPPLYING A REPLENISHING TONER TO A DEVELOPING UNIT

BACKGROUND OF THE INVENTION

1. Field of the Invention

This invention relates to an improvement of a device for supplying a replenishing toner to a developing unit provided in a dry type electrophotographic copying machine.

2. Description of the Prior Art

In electrophotography an electrostatic latent image is generally formed on the surface of a photoconductive insulated layer by known methods of electric charging and image wise exposure. The latent image is developed by magnetic brush. It is considerably troublesome generally in the construction of a developing means, which includes a carrier (iron, etc) brush using a magnet, to replenish the developing means with a developer, which is a mixture of carrier and toner. As is generally known, the toner content in the developer is decreased as the toner is consumed during copier operation. The construction of the conventional electrophotographic copying machine of known type has an automatic toner supplier to provide the developer in a developing unit with an amount of toner corresponding to the amount of toner consumed in the developing unit during copying operation. Such copying machines are ideal in operation, but the mechanisms which operate to automatically supply the toner by detecting the concentration of the toner in the developer by a detector results in a very complicated machine. For example, U.S. Pat. No. 3,616,969 discloses a copier in which the replenishing toner is constantly supplied. U.S. Pat. No. 3,572,922, for example, discloses the supplying of the replenishing toner in accordance with the charging amount. Furthermore, a device has not yet been developed for accurately measuring the concentration of the toner in the developer to control the toner supply amount thereof to prevent poor copying operation.

The toner supply devices generally used at present operate to supply a predetermined amount of toner corresponding to the amount substantially consumed in every copying operation of predetermined number of copy sheets. However, the types of originals to be copied, such as letters, photographs in a catalog, patterns, etc., cause the toner consumption to be different depending upon the type of the original documents. More particularly, when a large number of original documents having much black ground is copied, the amount of toner consumed is excessive, whereas when a number of original documents having much white ground is copied, the amount of toner consumed is much less, and accordingly, consistently good copies cannot be obtained. That is, it is not possible to maintain the toner content constant merely by replenishing the toner at a constant rate, irrespective of the varying optical densities of the originals. A device is known for adjustably supplying a toner of the amount in response to the toner consumption, but such device still has disadvantages. The toner concentration of the copied picture becomes irregular since the toner supply adjusting means used at present do not respond to the various darkness of the picture on a variety of original documents.

SUMMARY OF THE INVENTION

This invention eliminates the aforementioned disadvantages and provides an improved replenishing toner supply device in a developing unit which can adjustably supply a toner of the amount in a variable manner, without steps, to accurately adjust the amount of the toner depending upon the type of the originals.

This invention further provides a toner supply device which can finely adjust the toner supply amount by judging the gradiation of a copying picture even during copying operation so as to supply the toner of an optimum amount compared with the toner amount consumed in response to the picture on an original document.

This invention provides a toner supply device in which toner may be supplied by manual operation even while the copying machine is stopped.

The invention still further provides a toner supply device, in which the toner supplying member at the bottom of hopper is rotatable only in one direction so that a toner scratching plate for dropping the toner on the grooves, if provided, can be prevented from damage.

BRIEF DESCRIPTION OF THE INVENTION

FIGS. 2 and 3 are front views of operational portion of the toner supplying device, viewing from the back side of FIG. 1, in which FIG. 2 shows the case where the indicator is set at zero on the scale.

DETAILED DESCRIPTION OF THE PREFERRED EMBODIMENT

Figure 1:
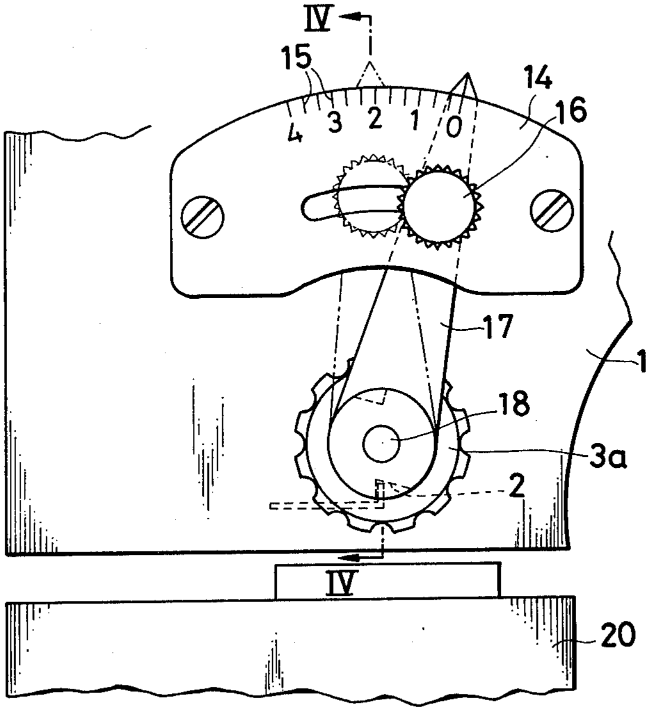
FIG. 1 is a front view of one embodiment of a toner supplying device according to the present invention.

A preferred embodiment of this invention will be particularly described with reference to FIGS. 1 to 4. Reference numeral 1 represents a hopper for a toner supply device. A toner supplying member 3, formed with grooves 2 for supplying the toner, is rotatably attached to the hopper 1, through which there is externally projected one end of the member 3, to which a manually rotatable knob 3*a* is mounted. In addition, the other end of the toner supplying member 3 is also externally protruded out of the hopper 1 to form a protrusion 3' to part of which part of a link 4 is rotatably secured. Further, a one-way clutch 5 which is engagable in only one direction, for example, a ratchet wheel, is mounted on the protrusion 3', and a rockable member 6 is attached via the clutch 5 to the supplying member 3. The rockable member 6 has arms 6*a* and 7 projecting therefrom, and a spring 8 is engaged with the arm 6*a* of the rockable member 6 in a manner urging the rockable member 6 clockwise in FIG. 2. A first projection or pin 9 is provided on part of the link 4 in a manner contacting with the arm 7 of the rockable member 6. Reference numeral 10 indicates a projection provided on a prime mover 11 for rockably driving the rockable member 6 in engagement with a long slot 12 of the link 4. Numerals 13 and 13' illustrate washers mounted on the toner supplying member 3 for holding the link 4 at a predetermined position on the protrusion 3'. There is provided a toner supply amount indicator plate, which will hereinafter be called "an indicator 14", out of the hopper 1, a toner supply scale 15 being provided on the indicator 14, and a knob 16 screwed through the indicator 14 to a lever 17 fixed to one end of a shaft 18 mounted through the toner supplying member 3, so constructed that the end of the lever 17 is matched to the scale 15 adjusted to an optimum supply amount of the toner. A rocking limiting member 19 having a stopper 19*a* is so fixed to the other end of the shaft 18 that the rocking range of the rockable member 6 is limited at the position where one end of the lever 17 is matched with the scale 15, with the stopper 19*a* controlling the rotation of the rockable member 6. Numeral 20 illustrates a developing unit provided at the lower portion of the toner supply device.

Figure 2:
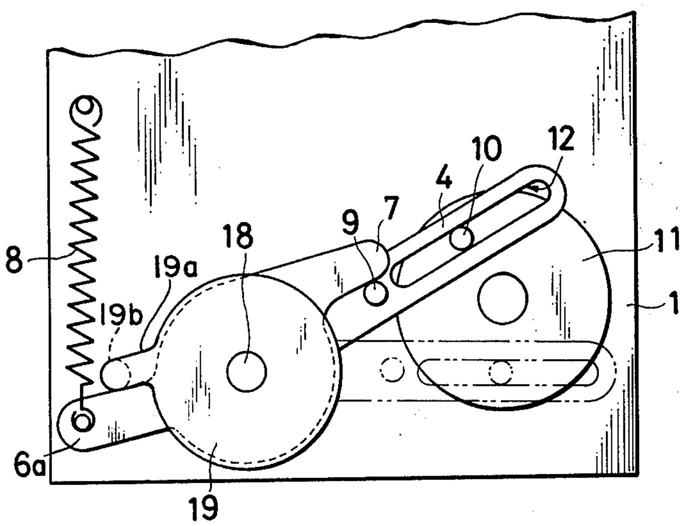
Figure 3:
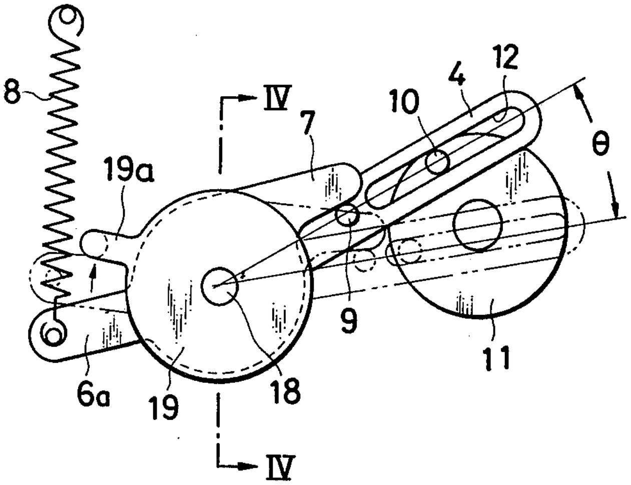
Figure 4:
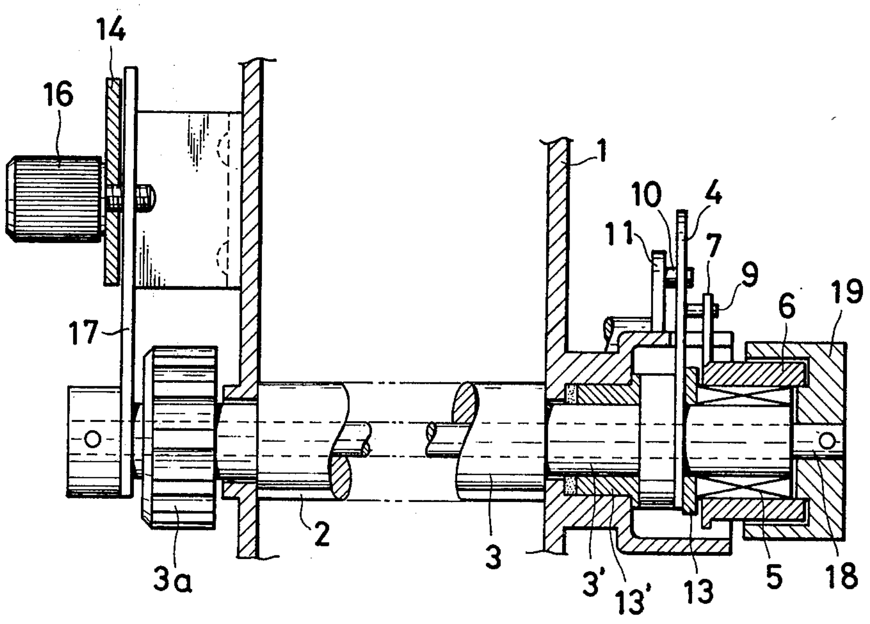
FIG. 4 is a side view, partly cut-away, of the toner supplying device taken along the line IV—IV of FIGS. 1 and 3 according to the present invention.

The operation of the device thus constructed will now be described. As shown in FIG. 1, after the knob 16 is unscrewed to loosen it from the indicator 14, the end of the lever 17 is moved along the scale 15 by using the knob 16 to select a predetermined amount of toner to be supplied. At the same time, the shaft 18 fixed to the lever 17 is accordingly rotated together with the member 19 to coincide the end of the lever 17 with the scale 15 to provide a desired density of a picture and to then fix the knob 16 to the indicator 14. Referring to FIG. 3, when a copying operation is conducted in this state, the prime mover 11 is rotated to cause the projection 10 to be rotated, with the result that the link 4 is rockably rotated around the protrusion 3′ with the shaft 18 as the center of rotation. As shown in FIG. 3, at that time in case the member 19 is moved to the rockable position with respect to the rockable member 6, the member 6 is rotated clockwise by the spring 8 when the rockable member 6 engaged with the pin 9 of the link 4 is disconnected at the arm 7 thereof from the pin 9, it is stopped at the position designated by a two-dotted broken line by a second projection 19*b* carried by arm portion 19*a* of the rocking limiting member 19 in FIG. 3. Even if the rockable member 6 is rotated in this case, the toner supplying member 3 is not rotated because the clutch 5 is disengaged to cause the member 3 to be freely rotatable. When the projection 10 is again rotated to the vicinity of the original position (FIGS. 2 and 3), the arm 7 of the rockable member 6 is driven by the pin 9 to rotate the rockable member 6 at an angle $\theta$ against the spring 8. In this case the clutch 5 is rotated in the engaged direction. Thus, the toner supplying member 3 is also rotated through the angle $\theta$. As shown in FIG. 2, when the end of the lever 17 is opposite the zero on the scale 15, the stopper 19*a* of the member 19 stops the rotation of the arm 6*a* biased by the spring 8, with the result that the arm 7 is not moved even if the pin 9 is rockably moved up and down by the rotation of the projection 10 and thus, toner is not supplied because the knob 3*a* is not rotated.

Accordingly, as shown by a two-dotted broken line in FIG. 1, the end of the lever 17 is matched to the position of the scale 15 considered as an optimum condition depending upon the toner density of the copied picture and the type of the originals, the rocking limiting member 19 is variably adjusted to operate the rockable member 6, and the toner supplying member 3 is rotated via the clutch 5 so as to supply the toner in the grooves 2 to the developing unit 20.

It is to be noted that when an insufficient toner amount is found even while the copying machine is stopped, the toner is supplied to the developing unit 20 by manually rotating the member 3 in one direction via the knob 3*a* according to this invention. In this case since the clutch 5 is disengaged the member 3 can be freely rotated in one direction with respect to the member 6. Thus, since the clutch 5 is operated in one direction, if there is provided a toner scratching plate for dropping the toner on the grooves 2, the plate can preferably be prevented from damage.

It should be understood from the foregoing description that since the device of this invention is so operated in case the toner in the developing unit 20 is insufficient that the end of the lever 17 is variably adjusted on the scale 15 shown on the indicator 14 as a standard to the position considered that the toner supply amount is optimum in response to the toner density on the copy sheet to be fixed thereat to always maintain the toner content in the developing unit 20 optimum, the lever 17 can be finely adjusted in response to the type of the originals to be copied to obtain an optimum copy picture.

What is claimed is:

1. A device for supplying a replenishing toner to a developing unit provided in an electrophotographic copying machine, comprising:
   - a rotatable toner-supplying roller adapted to be rotated only in one direction and to provide a predetermined quantity of replenishing toner;
   - a one-way clutch connected to said toner-supplying roller and rotatable therewith;
   - a rockable member mounted on said one-way clutch and adapted to be engaged therewith only in the rotational direction of said toner-supplying roller;
   - means for rotating said rockable member alternatively clockwise and counterclockwise;
   - adjustable limiting means for limiting the angular displacement of said rockable member;
   - a selector associated with an indicator for determining the amount of toner to be supplied, said selector being operatively associated with said limiting means to position said limiting means; and
   - a shaft extending coaxially with said supplying roller, said selector and said limiting means being rigidly mounted on opposite ends of said shaft, respectively, so that said selector is operatively associated with said limiting means to position said limiting means.

2. A device as claimed in claim 1 wherein said means for rotating said rockable member comprises:
   - a first projection member operatively connected to a motive means for powering the operation of the electrophotographic copying machine, said first projection member being moved rockably by movement of said motive means;
   - a first arm portion on said rockable member adapted to be engaged by said first projection member and rotated thereby; and
   - means for biasing said rockable member in the direction opposite from the rotational direction of said tonger-supplying roller.

3. A device as claimed in claim 2, further comprising:
   - an elongated link rotatably supported on said toner-supplying roller and operatively associated with said motive means, said link supporting said first projection member engageable by said arm first portion.

4. A device as claimed in claim 2, wherein said biasing means is a spring connected to a second arm portion of said rockable member.

5. A device as claimed in claim 4, further comprising:
   - a second projection member on said limiting means, said second arm portion being engageable by said second projection member so that the angular displacement of said rockable member may be limited according to the position of said second projection member.

6. A device as claimed in claim 1, further comprising manual means for rotating said toner-supplying roller in the one direction even when the copying machine is stopped.

* * * * *